United States Patent [19]

Déléris et al.

[11] Patent Number: 4,472,776

[45] Date of Patent: Sep. 18, 1984

[54] PROCESS AND APPARATUS FOR ELECTRONIC IGNITION CONTROL FOR AN INTERNAL COMBUSTION ENGINE

[75] Inventors: Robert Déléris, Bailly; Philippe Avian, Ecquevilly, both of France

[73] Assignee: Regie Nationale Des Usines Renault, Boulogne-Billancourt, France

[21] Appl. No.: 274,888

[22] Filed: Jun. 18, 1981

[30] Foreign Application Priority Data

Jun. 26, 1980 [FR] France ................................ 80 14198

[51] Int. Cl.³ ............................ F02P 5/04; F02P 3/02; G05B 15/02
[52] U.S. Cl. ................................ 364/431.12; 364/424; 364/569; 123/417
[58] Field of Search ...................... 364/431.01, 431.03, 364/431.04, 431.07, 431.12, 569, 424; 123/418, 419, 417, 416

[56] References Cited

U.S. PATENT DOCUMENTS

| | | | |
|---|---|---|---|
| 3,837,224 | 9/1974 | Ream, Jr. ........................ | 364/558 X |
| 4,175,508 | 11/1979 | Wesemeyer et al. ............... | 123/416 |
| 4,197,767 | 4/1980 | Leung ............................. | 123/419 X |
| 4,225,925 | 9/1980 | Hattori et al. .................. | 364/431.04 |
| 4,236,214 | 11/1980 | Sasayama ....................... | 364/431.07 |
| 4,296,471 | 10/1981 | Goux .............................. | 123/418 X |
| 4,359,987 | 11/1982 | Wesemeyer et al. ............... | 123/417 |
| 4,375,668 | 3/1983 | Leung et al. ................... | 364/431.04 X |

Primary Examiner—Edward J. Wise
Attorney, Agent, or Firm—Oblon, Fisher, Spivak, McClelland & Maier

[57] ABSTRACT

An apparatus having a device for measuring speed by counting pulses and a device for measuring pressure by counting pulses wherein a first memory stores advance correction coefficients and a second memory stores a value with respect to full-load advance. An advance counter is connected to the outputs of the second memory and to the highest-weight output of the pressure counter by way of a series connection of a binary rate multiplier, a divider which divides by M and a switching device.

9 Claims, 9 Drawing Figures

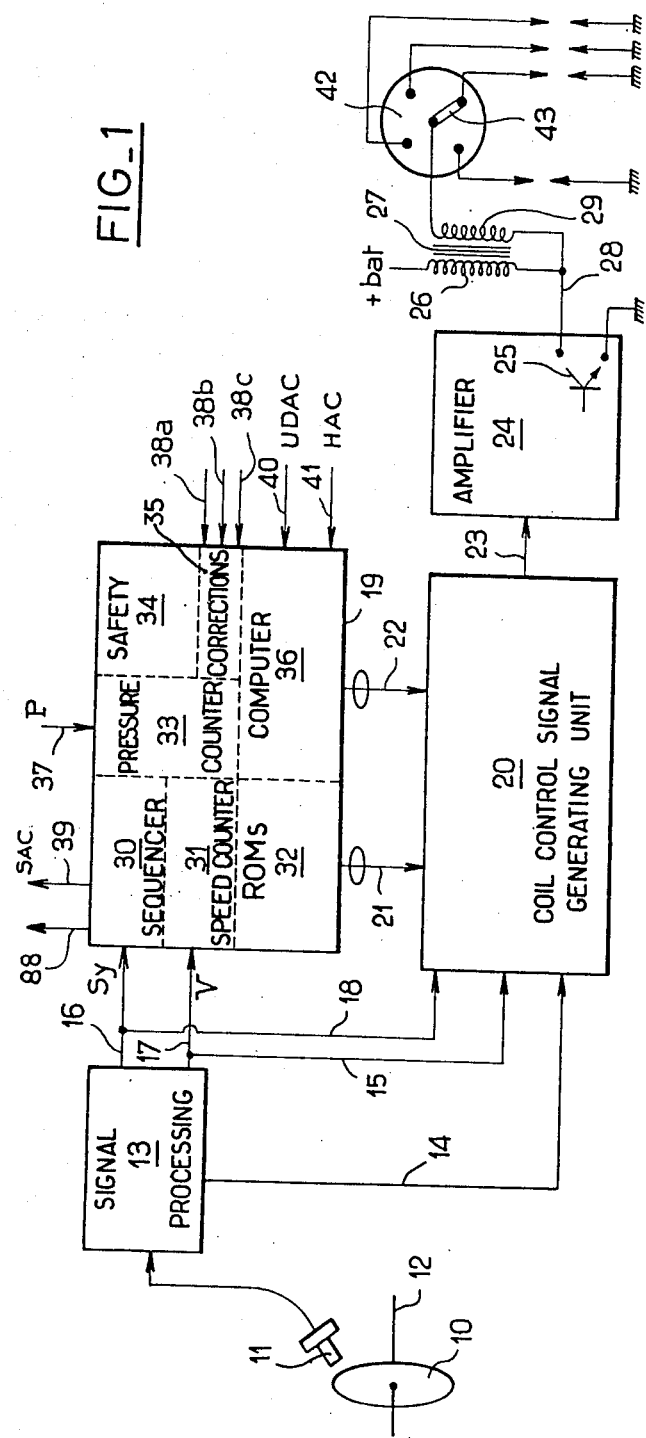
FIG_1

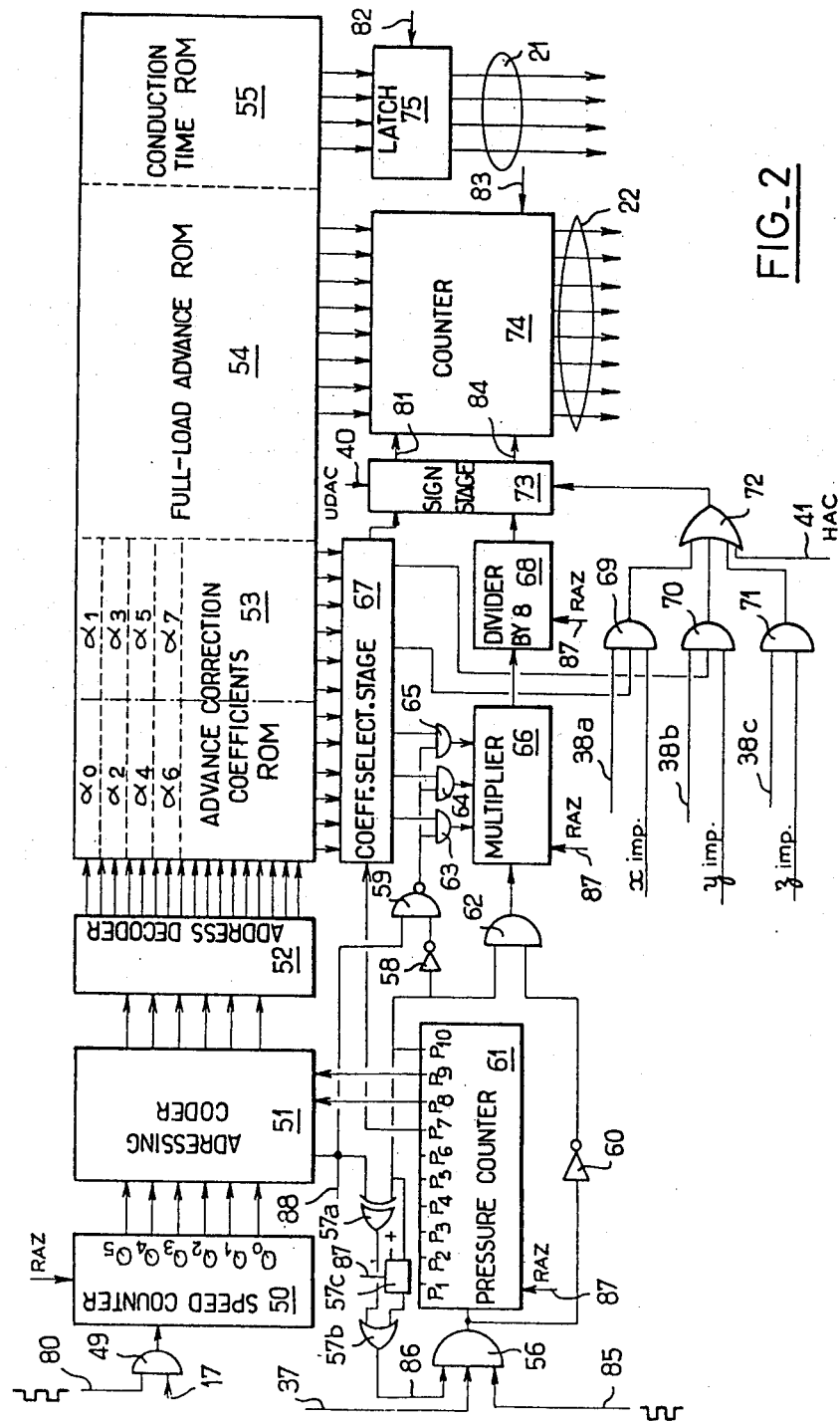
FIG_2

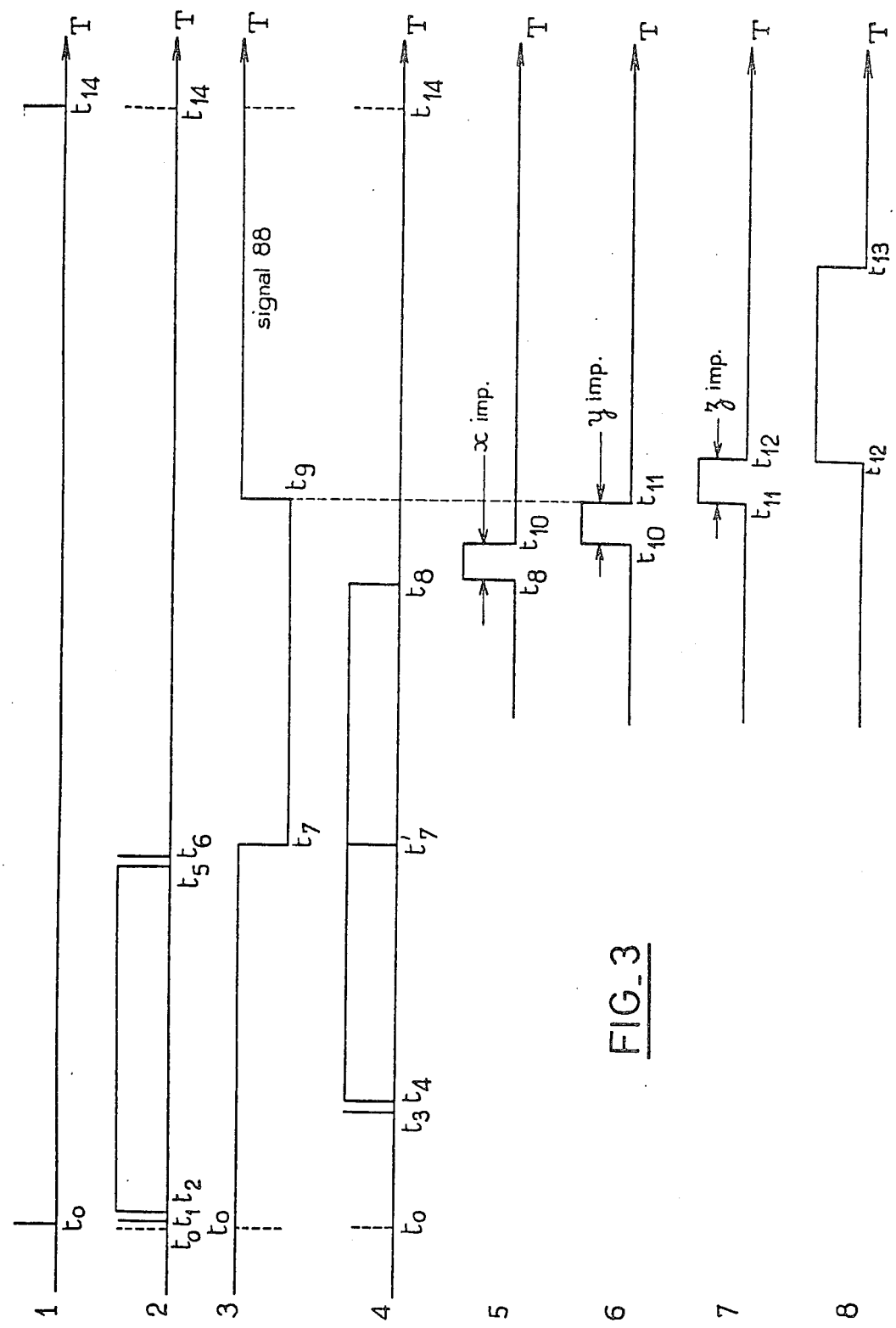
FIG_3

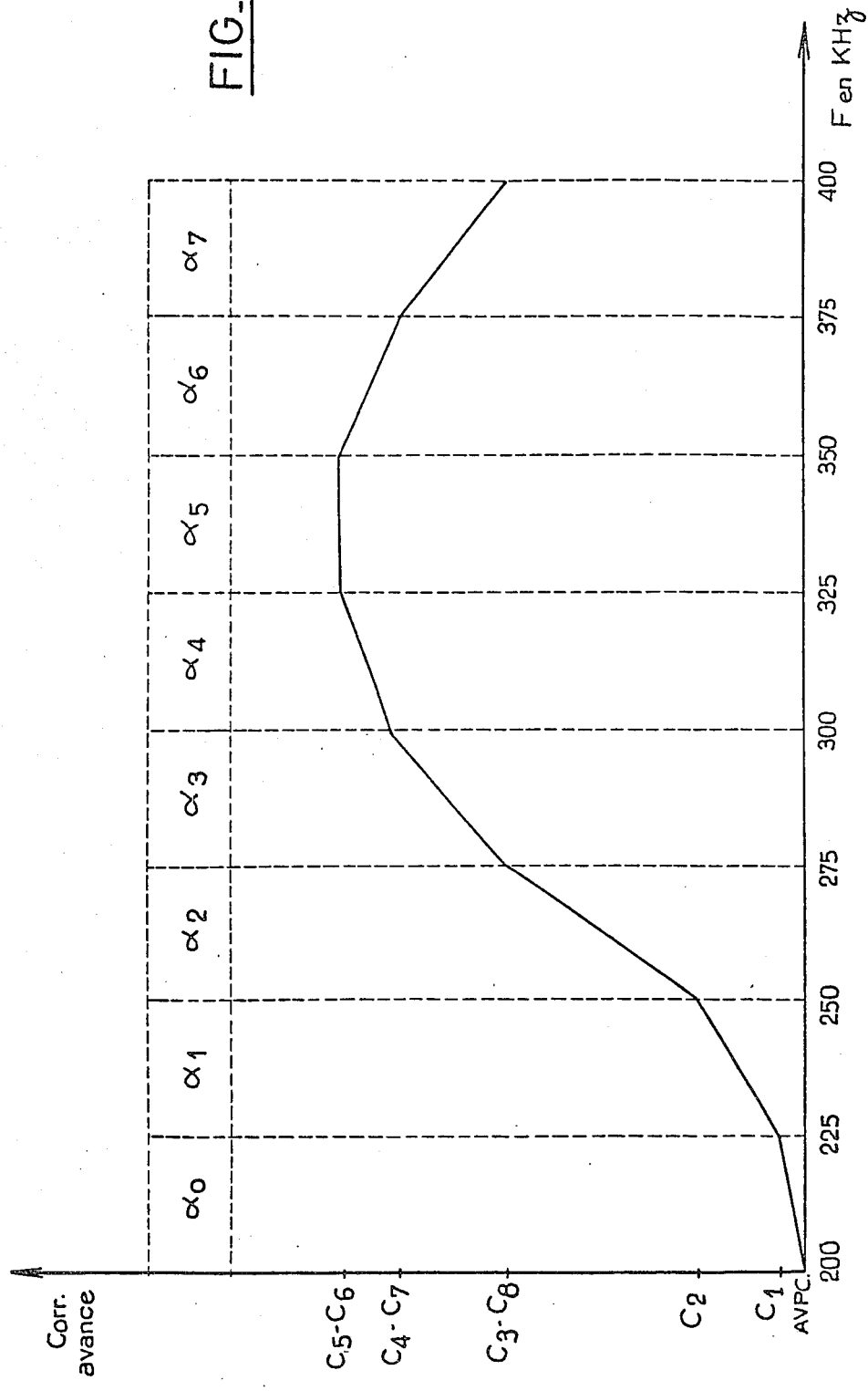

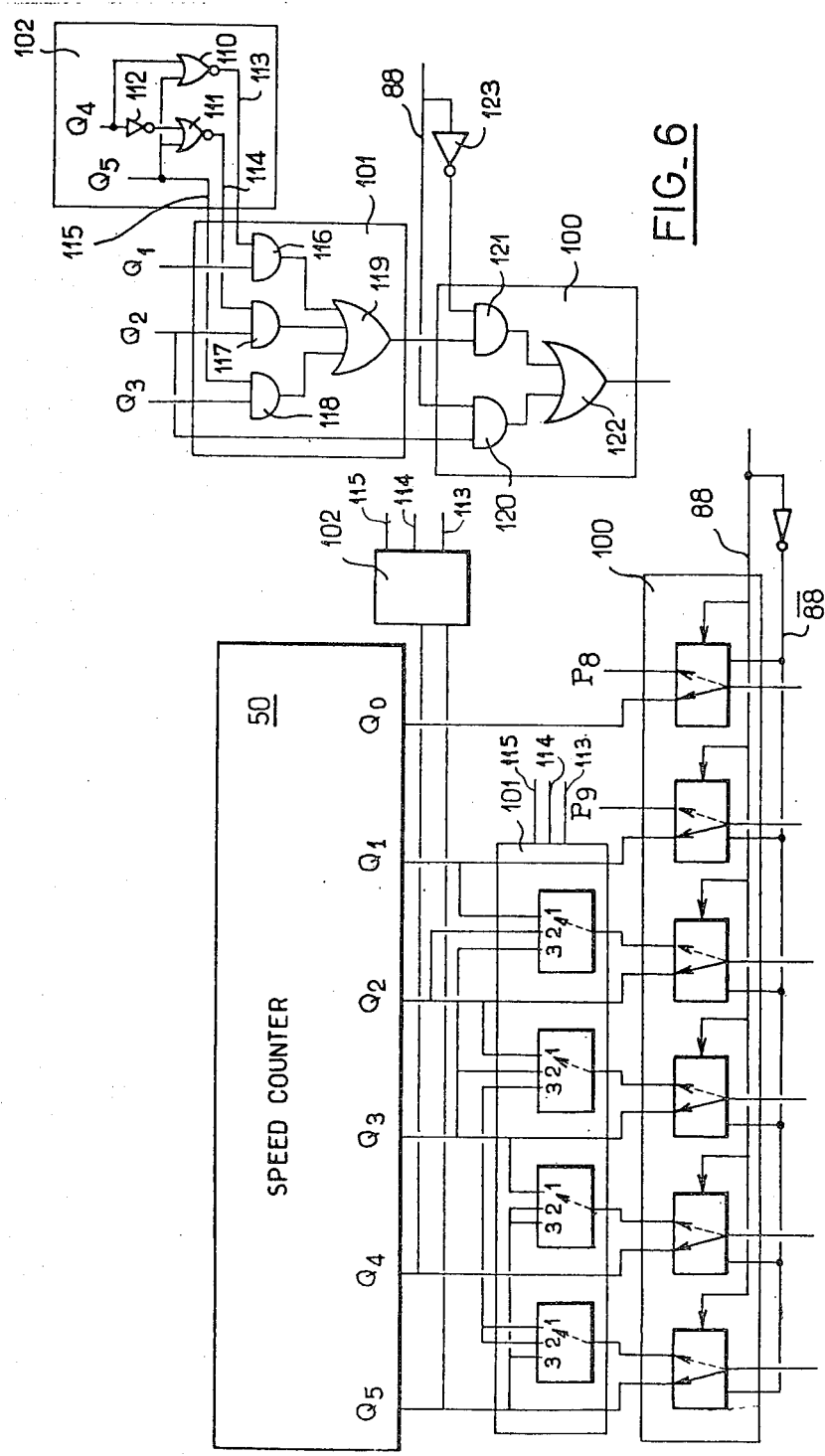

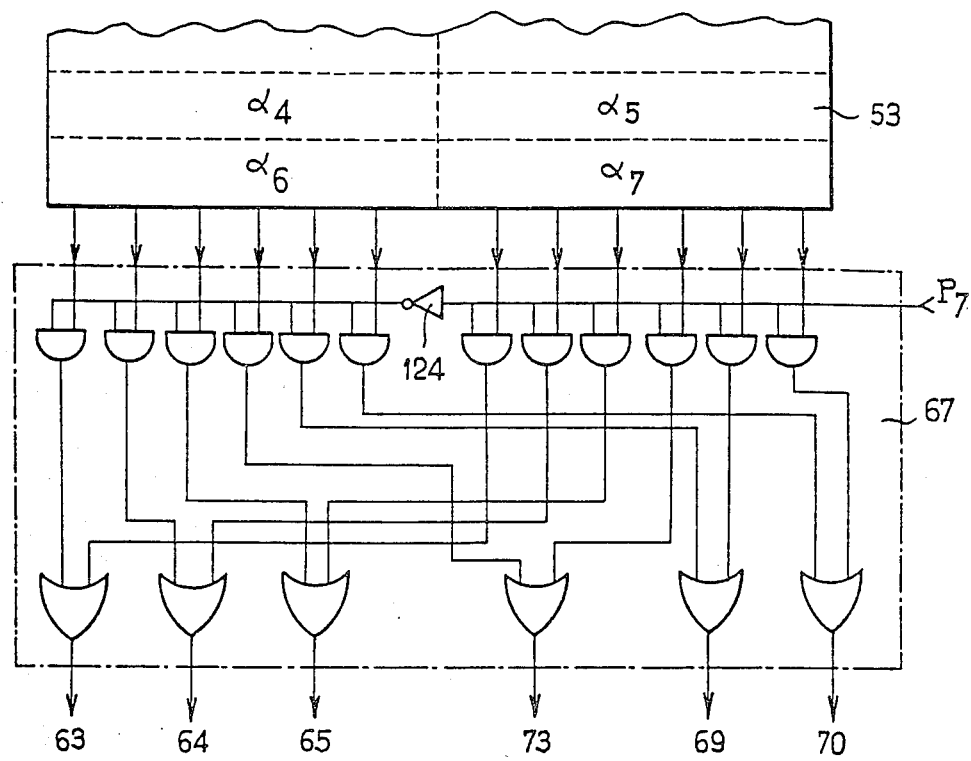
FIG_7
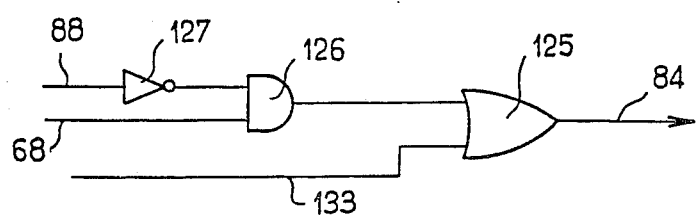
FIG_8
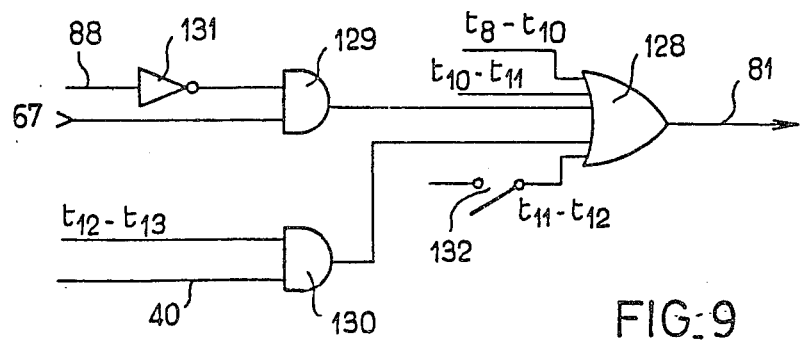
FIG_9

PROCESS AND APPARATUS FOR ELECTRONIC IGNITION CONTROL FOR AN INTERNAL COMBUSTION ENGINE

BACKGROUND OF THE INVENTION

1. Field of the Invention

The present invention relates to a process and apparatus for electronic ignition control for an internal combustion engine, in particular for a motor vehicle.

2. Description of the Prior Art

Control of the ignition of an internal combustion engine implies the possibility of producing ignition pulses which are displaced with respect to the top dead centre position by an amount which should be suitably determined, in order to cause the engine which is controlled in this way to operate correctly.

A system of this type was described and claimed in patent application No 75/30 902 filed on Oct. 9, 1975 and its certificate of addition No 76/11 524 filed on Apr. 20, 1976 for "Process and apparatus for electronic ignition control for an internal combustion engine". With the appearance of new types of internal combustion engines which are associated with more restricted controls in respect of pollution and anti-pinging, it is becoming more and more difficult to exploit to the maximum the levels of performance which were anticipated.

Indeed, if the system has a certain degree of redundancy in regard to the number of laws in respect of correction of ignition advance by means of the depression, it is unsatisfactory by virtue of the form of the law for correction of ignition advance by depression and by virtue of the fact that, without supplementary means, it is impossible to make ignition advance corrections which are limited to one pressure speed range and which are initiated by external sensors which detect the water temperature in the engine cylinder head or the air temperature in the intake manifold.

The present invention makes it possible to overcome these disadvantages.

SUMMARY OF THE INVENTION

The present invention makes it possible to produce requirements with respect to correction of ignition advance by means of the engine depression, which provide for better adaptation of the engine, in accordance with criteria concerning minimum fuel consumption, minimal polluting emissions, limiting pinking and stability of combustion, by reducing the number of correction laws programmed while permitting account to be taken of information originating from external sensors only in privileged engine speed and pressure ranges. In this way, it is possible to control the ignition in internal combustion engines which operate on fuels with a low octane number relative to the compression ratio or with supercharger devices, without using arrangements for ignition advance correction in dependence on pinging. The system can receive signals for correction of ignition advance dependent upon the pinging, in the form of series transmission.

The present invention uses two sub-assemblies which have been described and claimed by the present applicants and which provide the additional information concerning the peripheral devices:

patent application No 79/00 386 filed on Jan. 9, 1979 for a "Process and apparatus for marking the angular position of a member which is driven with a rotary movement", and patent application No 80/01 834 filed on Jan. 29, 1979 for "Ignition coil control device for an internal combustion engine provided with an electronic advance calculating means".

However, the principle of the invention can be applied to other peripheral devices, the technological adaptation of which is within the capability of the man skilled in the art.

The invention concerns a device for numerical calculation of the ignition advance angle for an internal combustion engine, with the explosion of fuel within a plurality of cylinders, of the type comprising a disc which has a given number of feature means regularly distributed around its periphery and which is non-rotatably fixed with respect to the crankshaft, and a single fixed position sensor which is associated with said disc, an ignition coil and a rotary spark distributor which are intended successively to cause explosions within the different cylinders of the engine by way of associated sparking plugs, of the type comprising: a stage for processing the signal produced by the position sensor and producing in particular a synchronisation signal and a speed signal; an electronic ignition advance calculating means or computer which produces a numerical value in respect of ignition advance angle at a first output and an unprocessed numerical value in respect of conduction angle of said coil at a second output; a stage for generating the signal for controlling said coil from the information produced by the sensing signal processing stage and by the two outputs of the computer; and a power stage for actuating said coil.

The numerical computer comprises in particular a sequencer, a speed measuring stage, a dead memory, a pressure measuring stage which is connected to an external sensor, a stage for actual calculation of the advance angle, comprising a series/parallel multiplier, a divider, an up-down counter and a stage for correction of the advance angle in dependence on the external parameters.

In a first aspect, the present invention concerns a process for operating an ignition advance computer for an internal combustion engine, of the type comprising: a sequencer; a means for measuring the speed of rotation and comprising in particular a speed counter; a means for measuring the pressure in the intake manifold comprising in particular a pressure counter and an assembly of read only memories, the process being distinguished in that the following steps are performed successively: speed measurement by counting pulses of the speed signal for a first measurement period which is determined by said sequencer; measuring pressure by counting a train of pulses corresponding to the frequency supplied by a pressure sensor for a second measurement period which is determined by said sequencer, and that ignition advance correction, taking into account the pressure, is effected in two successive phases, namely: a first phase for pre-loading the pressure counter corresponding to counting of a value NP/2 in said pressure counter, during which no advance correction is performed, NP being the maximum capacity of said pressure counter, and a second phase during which the correction of phase by the pressure is effected during the time difference between the pressure measurement step and the time for the pre-loading phase.

Advantageously, conditional advance corrections are also made, in dependence on external parameters such as the temperature and/or the presence of pinging above a predetermined speed and/or pressure.

In accordance with an important feature of the present invention, an approximation of the ignition advance correction curve is formed, in dependence on the pressure in the intake manifold, by means of eight successive straight segments which are disposed end-to-end.

In accordance with a second aspect, the present invention concerns an ignition advance computer for an internal combustion engine of the type comprising: a sequencer; a means for measuring the speed of rotation and comprising in particular a speed counter; a means for measuring the pressure in the intake manifold and comprising in particular a pressure counter and an assembly of dead memories, the arrangement being distinguished in that it comprises: first means for measuring speed by counting the pulses of the train of pulses forming the speed signal during a first measurement period which is determined by said sequencer; second means for measuring pressure by counting the pulses of a train of pulses corresponding to the frequency supplied by a pressure sensor during a second measurement period which is determined by said sequencer; an assembly of read only memories comprising: a first memory for the advance correction coefficients; a second memory for the full-load advance value and a third memory for the conduction time, said memories being addressed from said speed counter; and an advance computing counter which is connected on the one hand to the outputs of the full-load advance value memory and on the other hand to the highest-weight output of said pressure counter by way of the series connection of a binary rate multiplier, a divider which divides by M and a switching means.

In accordance with a first feature, the switching means is connected to the output of an assembly of means for introducing conditional advance corrections which are dependent on external parameters, in particular pinging.

In accordance with a second feature, said pressure counter comprises ten binary digits, the binary rate multiplier operates on three binary digits and the M-dividing divider performs operations of division by eight.

In accordance with a third feature, in the first advance correction coefficient memory, said coefficients are arranged to correspond to the successive segments of straight lines, which approximate the ignition advance correction curve in dependence on the pressure in the intake manifold, each coefficient comprising three main binary digits plus a binary digit in respect of the sign of the coefficient plus two conditional binary digits in respect of corrections by external phenomena.

In accordance with a fourth feature, said first advance correction coefficient memory is connected by its outputs to a second switching means connected by a first group of outputs to said binary rate multiplier and by a second group of outputs to the assembly of means for introducing conditional advance corrections.

In accordance with a fifth feature, the output ($P_7$) of said pressure counter is connected to said second switching means and the outputs ($P_8$ and $P_9$) of said pressure counter are connected as inputs to a coder for addressing of said dead memories.

In accordance with a sixth feature, said second switching means is connected by a supplementary output to an input of said first switching means for transmitting the binary digit corresponding to the sign of the correction and said first switching means is connected by its outputs on the one hand to the up-down counting input and on the other hand to the clock input of the advance-computing counter.

In accordance with a seventh feature, said pressure counter comprises an input connected to the output of the first logic AND-gate connected by a first input to said sequencer for receiving a pressure measurement square wave, a second input connected to the pressure sensor and a third input connected to the output of a group of gates for transmitting a synchronisation and capacity limitation signal.

Advantageously, disposed between said speed counter and said dead memories is a variable-step dead memory addressing coder.

In accordance with an eighth feature, said variable-step addressing coder comprises: a third speed/correction address switching means, an address coder and a step coder.

In accordance with a preferred embodiment, said variable-step addressing coder permits a change in advance correction coefficients, under the following conditions: (1) from zero to 1600 rpm every 200 rpm; (2) from 1600 to 3200 rpm every 400 rpm; (3) from 3200 to 6400 rpm every 800 rpm.

BRIEF DESCRIPTION OF THE DRAWINGS

Other features will be apparent from the following description which is given only by way of example. For this purpose, reference will be made to the accompanying drawings which illustrate a non-limiting embodiment of the invention and in which:

FIG. 1 shows a view in the form of a block circuit diagram of an embodiment of an ignition advance calculating means or computer incorporating the device according to the invention, FIG. 2 shows a detailed embodiment of the ignition advance computer shown in FIG. 1, FIG. 3 shows, in the form of an ordinogram, the performance of tasks in the computer of FIG. 2, FIG. 4 shows the curve in respect of correction of ignition advance in dependence on pressure in an approximation formed by means of eight straight-line segments, FIG. 5 shows an embodiment of a variable-step dead memory addressing coder, FIG. 6 shows a more detailed embodiment of the different cells involved in the addressing coder of FIG. 5.

FIG. 7 shows a detailed embodiment of the first switching means shown in FIG. 2, and FIGS. 8 and 9 show a detailed embodiment of circuits involved in a second switching means of FIG. 2.

The same references are used to denote the same components in the different Figures of drawings.

DETAILED DESCRIPTION OF THE PREFERRED EMBODIMENTS

Referring to FIG. 1 which shows a block circuit diagram of an embodiment of an ignition advance calculating means or computer incorporating the device according to the invention, the ignition advance computer 19 receives a synchronisation signal Sy at an input 16 and a speed signal V at a second input 17, which signals Sy and V are produced from a stage 13 for processing the signal produced by a position sensor 11 which detects the passage of the teeth provided at the periphery of a disc 10 which is fixed to the internal combustion engine crankshaft 12 and which rotates synchronously therewith.

The sensor 11 gives a permanent electrical image of the periphery of the target disc 10. This assembly was described in the above-mentioned French patent application No 79/00 386. The essential parts of the calculating means or computer 19, the subject of the present invention, are as follows: a sequencer 30 which supplies in particular dispatch information SAC in respect of correction of ignition advance in dependence on pinging, by way of an output line 39; a speed measuring stage 31; a dead or read only memory 32; a pressure measuring stage 33 connected to an external pressure sensor by way of an input line 37; a safety stage 34 for safeguarding against any mishap in operation of the computer 19; a correction stage 35 which is connected by three input lines 38a, 38b and 38c to external binary function sensors and a stage 36 for the actual operation of calculating the ignition advance angle, which receives information in respect of correction of the angle of advance in dependence on pinging, by way of an input 41 for pulse series HAC and an input 40 for the sign in respect of correction of advance in dependence on pinking, as shown at UDAC.

By way of its respective outputs 21 and 22, the computer 19 produces two binary numbers which respectively correspond to the angle of conduction of the coil 27, expressed in the form of the number of teeth on the disc 10, at output 21, and the ignition advance angle expressed in the form of the number of teeth of the disc 10 and the number of subdivisions between two teeth of said disc, at output 22. The two binary numbers are applied by way of the input conductors 21 and 22 to a unit 20 for generating the signal for controlling the coil 27, which unit 20 also receives three input signals on lines 14, 15 and 18, which are, respectively, the teeth of the disc 10 which is on line 14, the speed signal on line 15, which is produced by the subdivisions between two teeth of the disc 10, and the synchronisation signal on line 18. The coil control signal generating unit 20 provides at its output 23 a low-power signal which is transmitted to a power amplifier stage 24 whose output 28 is connected to the ignition coil 27 which has a primary winding 26 and a secondary winding 29 connected by way of one of its ends to the central part of a distributor 42 around which rotates the movable arm 43 which successively, during rotary movement thereof, forms a communication between the secondary winding 29 of the coil 27 and the sparking plugs of the different cylinders of the engine, to cause explosion and combustion of the mixture contained in the cylinders. This latter assembly, comprising the unit 20 for generating the signal for controlling the coil 27 and the power amplifier stage 24, is described in above-mentioned French patent application No 80/01 834.

FIG. 2 shows a more detailed embodiment of the stage for actually computing the ignition advance angle, as designated by reference 19 in FIG. 1, without the components 30 and 34.

This computing stage first comprises a speed counter 50 having an input by way of a logic AND-gate 49 which is connected at one input to the line 17 transmitting the speed signal originating from the processing stage 13 and which, at a second input 80, receives a speed measuring square wave in the form of a control signal issued by the sequencer 30 in FIG. 1, permitting measurement for a given period by said sequencer, with an increment value of 100 rpm. The counter for example is a counter with six binary digits which latches or locks at its maximum value in the event of measuring a speed which is higher than 6300 rpm. The speed counter 50 is connected by outputs $Q_0$ to $Q_5$ to the inputs of an addressing coder 51 which is connected by its outputs to the inputs of an address decoder 52.

The dead memory (ROM) indicated by reference 32 in FIG. 1 comprises, in the embodiment shown in FIG. 2, three essential parts, namely: a first dead memory 53 containing the actual advance correction coefficients; a second dead memory 54 for storing full-load advance, and a third dead memory 55 for storing conduction angle or conduction time. The three memories 53, 54 and 55 are addressed either directly, as regards the memories 54 and 55, by the speed counter 50 indicating speed between zero and 6300 rpm, by way of the addressing coder 51 and the address decoder 52, or indirectly, as regards the memory 53, by means of the coder 51 which then involves the four heavy-weight speed lines and two pressure digits. The advance correction coefficients in the memory 53 are coded in three bindary digits plus a binary digit in respect of sign for the load and two binary digits for external conditions, wherein each double group of six binary digits which is thus formed can be addressed and distributed differently depending on the circumstances of engine use, in a group of every 400 rpm or a group every 200 rpm, for a range necessitating more attention, or a group every 800 rpm for a range in which the advance values suffers from less variations or discontinuity in slope.

The ROM memory 54 representing full-load advance is defined by eight binary digits, the digit of lowest weight being worth one engine flywheel degree and being memorized at the same time as the value representing the conduction time in the counter 74.

The third memory 55, referred to as the memory for storing conduction time, is connected by ways of its outputs to a latch 75 which memorizes in four binary digits, the value of the angle of conduction as supplied by the memory 55 and subsequently transmitted at outputs 21 to the circuit 20 in FIG. 1, for generating the signal for actuation of the coil 27.

The full-load advance memory 54 is connected by way of its outputs to an up-down counter 74 for computing advance, which memorizes in eight binary digits, the ignition advance value which is subsequently transmitted by its outputs 22 to the circuit 20 in FIG. 1. The outputs 21 of the latch 75 and the outputs 22 of the counter 74 correspond to the lines 21 and 22 shown in FIG. 1. The up-down counter 74 has a first up-down counting input 81; a second clock input 84 and a loading input 83. The latch 75 has a loading input 82.

The computing stage according to the invention also comprises a pressure counter 61 which, in the embodiment illustrated, is a counter having ten synchronous binary digits of the frequency signal corresponding to the pressure obtaining in the intake manifold of the internal combustion engine during the pressure measuring square wave originating from the sequencer 30 in FIG. 1, by way of a first line 85 which is connected to the counter 61 by way of a logic AND-gate 56 which is connected at a second input to the second line 37 of FIG. 1, which is connected to the sensor for detecting the pressure obtaining in the intake manifold, and by way of a third line 86 to an assembly of gates 57a, 57b and 57c for transmitting a synchronization and capacity limitation signal. The assembly of gates comprises a first logic EXCLUSIVE-OR-gate 57 which is connected by one of its inputs to an output of the addressing coder 51, by way of a second input to the output $P_{10}$ of the pressure counter 61 and by way of its output to an input of the second logic OR-gate 57b which is connected by its output 86 to an input of the above-mentioned logic AND-gate 56.

The second input of the logic gate 57b is connected to the output $\overline{Q}$ of a flip-flop 57c of type D, of which the input D is connected to battery positive, whose clock input is connected to the output $P_{10}$ of the pressure counter 61, and whose resetting input is connected to the resetting terminal 87 of a binary rate multiplier 66. The pressure counter 61 comprises ten outputs numbered from $P_1$ to $P_{10}$. The outputs $P_8$ and $P_9$ are connected in parallel to inputs of the addressing coder 51.

Besides its connections to the logic gate 57a and to the flip-flop 57c, the output $P_{10}$ is also connected on the one hand to a first input of a logic NAND-gate 59 by way of an inverter 58 and on the other hand, to a first input of a logic AND-gate 62, the latter being connected by a second input to the output of the logic AND-gate 56 already referred to above, by way of an inverter 60, while also being connected by way of its output to an input of the above-mentioned multiplier 66. The output $P_7$ of the pressure counter 61 is connected to a trigger input of a coefficient selection stage 67 which is also connected by means of its series of upper inputs to the outputs of the memory 53 in which the advance correction coefficients are stored in two groups of six binary digits, as already described above. The coefficient selection stage 67 is connected by three first outputs in parallel to the first inputs of three logic AND-gates 63, 64 and 65 which are all connected in parallel by way of their second input to the output of the NAND-gate 59 and by way of their outputs in parallel to three inputs of the binary rate multiplier 66 for introducing thereinto the three binary digits of the advance correction coefficient selected in the memory 53. The second input of the NAND-gate 59 is connected to an output of the addressing coder 51 and to an input of the EXCLUSIVE-OR-gate 57a. The right side output of the coefficient selection stage 67 is connected to the "SIGN" input of a stage 73 providing for determining the sign of the pressure correction step. At a second input, the stage 73 is connected to the line 40 already shown in FIG. 1, for receiving a signal UDAC, namely the sign in respect of correction of advance in dependence on pinging.

Returning now to the binary rate multiplier 66 handling three binary digits in the embodiment illustrated, the output of the multiplier is connected to the input of a stage 68 for dividing by M; in the embodiment illustrated, the stage 68 is a divider for dividing by eight, the output of which is connected to a second input of the abovementioned stage 73. The stage 73 is connected by way of its third input which is in its lower part, to the output of a logic OR-gate 72 having four inputs, the first three inputs being connected to the respective outputs of three AND-gates 69, 70 and 71 while the fourth input is connected to the line 41 which has already been shown in FIG. 1 and which transmits series pulses in respect of correction of ignition advance in dependence on pinging, such pulses being produced by the anti-pinging clock of the installation. On each of the three logic gates 69, 70 and 71, the upper line serves to carry the possible corresponding correction command originating from the exterior, the lower line serves respectively to receive x pulses for the gate 69, y pulses for the gate 70 and z pulses for the gate 71, which are supplied by the sequencer 30 shown in FIG. 1, while the intermediate line, in the case of gates 69 and 70, is connected to an output of the coefficient selection stage 67. The stage 73 which makes it possible to determine "the type of pressure correction/anti-pinging external correction" is connected by way of its two outputs 81 and 84 respectively to the up-down counting input and to the clock input of the advance computing counter 74 which has eight binary digits. The counter 74 and the latch 75 have loading inputs which are respectively designated 83 and 82 and which are connected to the sequencer 30 in FIG. 1. The stage 73 for determining "the type of correction" is formed by means of a circuit which will be described hereinafter.

The mode of operation of the electronic ignition control device for an internal combustion engine, in accordance with the present invention, and more particularly, the mode of operation of the advance calculating means or computer shown in FIGS. 1 and 2, will now be described with reference to FIG. 3 which shows, in the form of an ordinogram, the manner of performance of the tasks in the computing unit. Shown on line 1, which gives times in the abscissae, as on all the other lines in FIG. 3, are two pulses Sy which respectively occur at a top dead center position or a bottom dead center position and consequently successively defining between them a period of time corresponding to a complete cycle of calculation of the advance angle, by means of the computer 19. Each synchronization pulse Sy is transmitted by lines 16 and 18 in FIG. 1 to the sequencer 30 and to the stage 20 for generating the signal for actuating the coil 27. Production of the synchronization pulse Sy at the time $T_0$ triggers loading of the latch circuit 75 and the advance computing counter 74 by way of the loading inputs 82 and 83 respectively. At moment $t_1$, on line two in FIG. 3, the speed counter 50 is reset to zero by acting on its input RAZ and the speed of the vehicle is measured between the moment $t_2$ which is very close to $t_1$ and $t_5$ by counting the speed signal V at the logic gate 49. At moment $t_6$ which is close $T_5$, the sequencer 30 triggers loading of the counter 74 from the memory 54 and memorization of the conduction time in 75. Line three of FIG. 3 showws the moments $t_7$ and $t_9$ (signal 88) at which the sequencer 30 triggers the composite speed/pressure addressing of the correction coefficient memories 53.

Line four in FIG. 3 illustrates the process for correction of ignition advance, which takes into account the depression in the intake manifold of the internal combustion engine. At moment $t_3$, the sequencer 30 causes the binary rate multiplier 66, the divider 68, the counter 61 and the member 57c to be reset to zero and, at moment $t_4$, the sequencer 30 begins the process for correction of ignition advance in dependence on pressure. This advance correction step lasts for example for 2.56 ms and comprises two successive phases: a first waiting phase which is between moments $t_4$ and $t_7$ during which 512 pulses are counted in the counter 61 during a period ranging from 1.28 ms for a pressure of 400 KHz to 2.56 ms for a pressure of 200 KHz; and a second correction phase in the true sense, during the period of time which elapses between $t'_7$ and $t_8$; $t'_7$ is a variable moment between $t_7$ and $t_8$, which depends on the pressure in the intake manifold.

The pressure is measured by counting, in the counter 61 which has ten binary digits, the signal frequency/pressure in the intake manifold, during the square wave $t_4$–$t_7$ from the sequencer 30. The frequency of the pressure sensor signal varies from 200 KHz for full-load conditions to 400 KHz for the maximum intake depression. An operation of counting for 1.28 ms is first performed in the counter 61 before the sequencer 30 produces a signal at moment $t_7$, which provides for corrections of advance by the engine load and which is inputted into the assembly of gates 57 by way of the input 88 in FIG. 2, which assembly 57 also receives the output $P_{10}$ of the counter 61 which goes to "one" when the counter 61 has incremented 512 times. The gate assembly 57 makes it possible on the one hand to limit the correction value in the case where, for any reason, the pressure sensor and the associated electronic arrangement produce a frequency which is higher than 400 KHz, and on the other hand, it provides for synchronization of the assembly of the sequencer, pressure frequency and corrections of the advance value, for counted values of from 512 to 1024 counted by the pressure counter 61 and therefore for frequencies of from 200 to 400 KHz.

These 512 possible pulses which are between 512 and 1024 when the frequency supplied by the pressure sensor is 400 KHz (full depression in the intake manifold of the internal combustion engine) are broken down into eight times 64 pulses, the groups of 64 pulses being passed by way of the logic inverting gate 60 and the AND-gate 62 to the multiplier 66 and the eight groups, defined by the outputs $P_7$ to $P_9$ of the counter 61, permitting selection of the eight coefficients $a_0$ to $a_7$ in the memory 53.

The correction operations are permitted when the output $P_{10}$ of the counter 61 has gone to "one", causing input of the coefficient from the ROM 53 by way of the gates 58, 59, 63, 64 and 65, and allowing input by way of the gate 62 of the frequency-pressure signal which is inverted by the gate 60 in the programmable frequency multiplier 66 which provides for calculation of the number which is representative of the correction by the engine load, by the multiplication of n pulses of the frequency-pressure signal and the value of the correction coefficient which is between zero and seven (coded in three binary digits), the number n being between zero and 64 for each correction sector selected by the value in respect of the pressure.

Therefore, for exploring all the possible engine loads, we have n ranging from zero to seven times 64 pulses plus a number p which is between zero and 64 for the last segment, the selection of coefficients being addressed by the binary digits 7, 8 and 9 ($P_7$, $P_8$ and $P_9$) of the pressure counter 61 and the 64 pulses of each correction coefficient being converted into a value between zero and 56 in steps of eight pulses according to whether the correction coefficient is between zero and seven, which, after division by eight in the divider 68, gives corrections ranging from zero to seven degrees in integral values of one degree at a time, that is to say, a possible correction total of 56 degrees at the engine flywheel, for the eight correction segments. The correction pulses are then passed to the switching means 73 which also takes into account the direction (or sign) of the correction to be performed, originating from the coefficient switching means 67; the switching means 73 also receives the signal in respect of various correction steps by way of an OR-gate 72 and directs all the corrections to the clock input of an advance computing counter 74 which, before performing the various correction operations, had been loaded with the advance value corresponding to full load, which was produced by the corresponding ROM 54 which is addressed every 100 rpm by the speed counter 50.

The various correction steps coming from the gate 72 are controlled by external members such as thermo-contacts etc., and their values are fixed in the sequencer 30 by a gate which allows x, y or z pulses to pass when the external member indicates a load or temperature state which requires a clearly defined correction, and, on correction steps Nos 1 and 2, for a supplementary condition which may be dependent on the engine load or speed or both those factors at once, this being provided in order better to delimit the particular functions involved, said conditions themselves being programmed in the same manner as the coefficients in respect of correction steps in dependence on the load in the ROM 53. The gate 72 also receives the pinking correction signal at an input 41 connected to the anti-pinking clock generated by an external system, the sign of the correction step being taken into account by the switching means 73. Lines 5, 6, 7 and 8 in FIG. 3 illustrate the succession of the various correction operations. For example, line 5 corresponds to a correction step No 1 which comprises dispatching x pulses by way of the logic gate 69. The same situation arises in regard to lines 6 and 7 which correspond to the dispatch of y and z pulses respectively by way of gates 70 and 71. Finally, line 8 corresponds to authorization for the dispatch of anti-pinging pulses by the line 41 during the periods $t_{12}$ and $t_{13}$, in the form of a signal supplied to the external pinking processing system by the sequencer 30. A fresh synchronization pulse Sy corresponding to the beginning of a fresh computing cycle, occurs at moment $t_{14}$.

FIG. 4 shows the curve in respect of ignition advance correction in dependence on the frequency in KHz, as measured by the pressure sensor in the intake manifold, for frequencies between 200 and 400 KHz, the frequency of 200 KHz corresponding to advance under full-load conditions and being set at the zero position of the coordinates. The curve itself has been replaced by eight successive straight-line segments each corresponding to a range of variation in respect of frequency of 25 KHz, and the group of advance correction coefficients corresponding to a given straight-line segment $a_0$ to $a_7$ is to be found at a position determined by an address in the advance correction coefficient memory 53.

The load on the internal combustion engine is represented by the depression in the intake passages of the engine. The depression as detected by a sensor such as is used in integral electronic ignition provides a signal of variable frequency, in dependence on said depression. The frequency varies from 200 KHz for ful-load conditions, which may be an over-pressure when using a turbo-compressor for supercharging the internal combustion engine, and rises progressively to a frequency of 400 KHz for full intake manifold depression, that is to say, when the internal combustion engine is producing a braking force. The different loads must therefore produce different ignition advance situations, this also depending on the operating condition of the internal combustion engine, in order to permit a lower level of pollution, while maintaining performance levels. The system which has eight slopes makes it possible to explore or scan the space representing the load of the engine, with eight straight-line segments each corresponding to a scanning or exploration action in respect of a frequency of 25 KHz and therefore, for a non-supercharged internal combustion engine, corresponding to a variation in depression of the order of 100 mbars. Depending on the precise value of the depression, the segments are followed from the full-load point in steps of one flywheel degree, with a capacity of zero to seven flywheel degrees, depending on the value of the coefficient of the segment in question, and the segments traversed are added algebraically until reaching the final depression counting value which may be anywhere on a segment and which consequently provides a correction effect which is appropriate to the conditions in respect of operating situation and load of the internal combustion engine.

The addressing operation deserves particular attention: the full-load advance memory 54 and the conduction angle memory 55 are addressed directly by the speed counter 50 indicating speeds of between zero and 6300 rpm; in contrast, the coefficients of correction for load and external correction conditions are coded in three binary digits plus a binary digit in respect of sign for the load, and two binary digits in respect of the external conditions; each group of six binary digits which is thus formed can be addressed and distributed differently depending on the situations of engine use, in a group every 400 rpm or a group every 200 rpm for a region requiring more attention, and 800 rpm for regions in which the advance value suffers from fewer variations and less discontinuity in slope, in conjunction with the curve in FIG. 4.

This difference between full-load advance addressing, coil conduction angle addressing and addressing in respect of the correction slope coefficients requires special coding which can be described as follows: addressing on the six binary digits of the measured speed going directly to the advance ROM 54 and the conduction angle ROM 55 and acquisition immediately after speed measurement and then composite coding involving on the one hand the four heavy-weight binary digits in respect of speed and on the other hand the two heavy-weight binary digits in respect of pressure, the whole retaining the six address lines and permitting the group acquisition of two load correction coefficient values which are then selected by the binary digit $P_7$ of the pressure measurement operation by way of the switching means 67; in general, this gives an address every 100 rpm for the full-load advance and conduction angle and an addressing action every 400 rpm for load corrections, with eight coefficients for each section of 400 rpm, which are addressed by the pressure, the assembly permitting a common portion for a complex and voluminous arrangement which is formed by the address decoder of a memory.

In some situations of engine use, it may be necessary for the engine load correction zones to be distributed differently and, consequently, for the load coefficient address coder to be modified. FIG. 5 shows an example of this, in which the invention is concerned with a variable-step addressing operation for the values in respect of load coefficients, ranging from one step every 200 rpm from zero to 1600 rpm, every 400 rpm from 1600 to 3200 rpm, and every 800 rpm from 3200 to 64 rpm, this being effected while occupying the same memory space and permitting an improved definition in respect of operating conditions in which the variation in load results in substantial variations in advance, with different profiles in respect of the regions of operating conditions, which are close to each other.

In this example, address coding is effected by way of a first speed/correction switching means 100, providing for addressing of the arrangement of the memories 54 and 55 by the speed and the load coefficients by a composite speed/pressure address, which composite address is produced by the heavy-weight digits of the pressure, as in the foregoing basic principle, plus four digits from a second switching means 101 which involves the outputs $Q_1$, $Q_2$, $Q_3$ and $Q_4$, that is to say, values which change every 200 rpm when those outputs ($Q_0$ to $Q_5$) indicate values of between zero and 1600 rpm for the switching means, this being by way of a supplementary coder 102, the switching means 101, for control operations with a different step, produces connection between the outputs $Q_2$, $Q_3$, $Q_4$ and $Q_5$ and finally, for steps of 800 rpm, the coding switching means involves the outputs $Q_3$, $Q_4$, and $Q_5$ twice.

FIG. 6 shows a more detailed embodiment of the different cells involved in the variable-step address coder in FIG. 5 and makes it possible at the same time to explain the mode of operation thereof in greater detail. A first cell 102 which is the step coder comprising NOR-gates 110 and 111 and an inverter 112 makes it possible to know, depending on the outputs $Q_4$ and $Q_5$ of the speed counter 50, if the speed is between zero and 1600 rpm, by means of its output 113, if the speed is between 1600 and 3200 rpm, by means of its output 114, and, finally, if the speed is higher than 3200 rpm, by means of its output 115. When the speed is lower than 1600 rpm, the outputs $Q_4$ and $Q_5$ are at zero and the output 113 is at one, with the outputs 114 and 115 remaining at zero. When the speed is between 1600 rpm and 3200 rpm, the output $Q_5$ is at zero while $Q_4$ is at one, and this, by way of the inverter gate 112, makes it possible to find zero levels between the two inputs of the gate 111 and therefore a logic level one at its output 114. Above a speed of 3200 rpm, the output $Q_5$ is at one and blocks the signals at the outputs 113 and 114, while the level at the conductor 115 is one.

Starting from these speed selection operations, by means of AND-gates 116, 117 and 118 of the address coder stage 101, a selection is made among one of the speed lines required for the address coding operation, depending on a variable coding proposition, namely, the binary digit $Q_1$ which in the present case permits addressing every 200 rpm of a series of 4×2 coefficients $\alpha_0$ to $\alpha_7$ in the memory 53 is switched to an OR-gate 119 having three inputs, when the signal on the line 113 is in logic state one, and therefore, by way of the logic gate 116, permits the address $Q_1$ to pass whereas the other addresses $Q_2$ and $Q_3$ are barred by the signals on the lines 114 and 115 and the gates 117 and 118. The same principle is used to select either the speed output corresponding to addressing of the full-load advance ROM 54 and the conduction angle ROM 55, or an output which is selected depending on the coding desired by a group of logic gates 120, 121, 122 and 123 belonging to the switching means 100. The gate 120 which is an AND-gate having two inputs is connected to the one hand to the line $Q_2$ from the speed counter 50, which will normally serve for normal addressing of the full-load advance ROM 54 and the conduction angle ROM 55, and on the other hand, to the line 88 carrying a signal indicating by logic state one that the system is performing a speed measurement operation and by means of logic state zero, a load correction operation. This same signal, which is inverted in the inverter 123, when it is at state one after the inverter 123, enables the coded addresses issuing from the OR-gate 119 to arrive at the input of the OR-gate 122 having two inputs.

Therefore, at the output from the gate 122, there is the normal addressing when the speed/correction signal is at logic state one, and the address which is coded, in accordance with the speed, when the speed/correction signal is at logic state zero, that is to say, when ignition advance correction in dependence on load is to be effected.

FIG. 7 shows a detailed embodiment of the switching means 67 of FIG. 2, which is disposed between the outputs of the memory 53 containing the advance correction coefficients α, the output $P_7$ of the pressure counter 61 and six inputs in direction, from left to right, as follows: the three AND-gates 63, 64 and 65 in FIG. 2, the switching means 73 for transmitting thereto the sign in respect of pressure correction, and two AND-gates 69 and 70 in FIG. 2 for transmitting thereto respectively condition one and condition two corresponding to the signals of lines 5 and 6 in FIG. 3. The design principle is the same involved in producing a cell of the speed/correction address switching means 100 illustrated in FIG. 6, which is formed by two AND-gates connected to the inputs of an OR-gate.

FIG. 7 shows immediately that, in a similar manner, the switching means 67 comprises six OR-gates, the output of each of which forms an output of the means 67 and the functions of which have been set forth hereinbefore, each OR-gate being associated by means of its inputs with two AND-gates. Therefore, there is a total of twelve AND-gates each connected respectively by one input to an output of the memory 53 on the one hand, and on the other hand, all such gates being connected in parallel by way of their second input to the output $P_7$ of the pressure counter 61, with the interposition of an inverter 124 between the first six gates and the six following gates.

FIGS. 8 and 9 show a detailed embodiment of the essential parts of the means 73 in FIG. 2, which is disposed between the outputs of the switching means 67, the stage 68 for dividing by eight, the output of the OR-gate 72 for transmitting the supplementary conditional corrections shown at lines 5 to 8 in FIG. 3, and the inputs 81 and 84 of the advance computing counter 74 with eight binary digits.

As shown in FIG. 8, the part of the switching means 73 which is connected to its output 84 and which can be referred to as the clock gate, comprises at the output an OR-gate 125 which is connected by one of its inputs 133 to the output of the logic gate 72 and by the second of its inputs to the output of an AND-gate 126 having two inputs which are respectively connected to the output of the divider stage 68 and to the input 88 for transmitting, by way of an inverter 127, the enabling signal for passing the load correction pulses originating from the divider stage 68.

Referring to the view shown in FIG. 9, the part of the means 73 which is connected to its output 81 transmits the correction signs when the corresponding correction pulses are transmitted by the clock gates. The sign of the external corrections originating from gates 69, 70 and 71 in FIG. 2 is always positive. Therefore the corresponding square waves from the sequencer 30 are added logically by an OR-gate 128 having five inputs, two of which are connected to the corresponding outputs of two AND-gates 129 and 130. Referring back to FIG. 3, lines 5 to 8, there will be identified the different corrections in respect of which the signs are transmitted by means of four of the five inputs of the OR-gate 128, with the fifth input being connected to the output of the means 67 for receiving the sign therefrom. Only the correction originating from the logic gate 71 in FIG. 2 can be programmed to permit correction operations which are positive or negative, by means of a circuit-breaker switch 132 which makes it possible to produce positive corrections when it is closed and negative corrections when it is open.

We claim:

1. In an ignition advance computer for an internal combustion engine comprising:

a sequencer;

a means for measuring the engine rotation speed, said means including a digital rotation sensor for generating a first pulsed signal at a frequency representative of said speed and a speed counter for counting the number of pulses of said first pulsed signal occuring during a first measuring time controlled by said sequencer;

a means for measuring the intake manifold air pressure, said means including a digital pressure sensor for generating a second pulsed signal at a frequency representative of said pressure, and a pressure counter for counting the number of pulses of said second pulsed signal occuring during a second measuring time controlled by said sequencer;

read only memory means;

addressing means responsive to the content of said speed counter and of said pressure counter for addressing said memory means;

external advance corrections intake means for correcting advance as a function of external parameters such as temperature; and an advance computer means, the improvement wherein said read only memory means comprises a first memory for storing full-load advance values, said first memory being addressed responsive to the content of said speed counter, and a second memory for storing advance correction coefficients, said second memory being addressed responsive to the content of both said speed counter and said pressure counter, said advance correction coefficients being arranged in a succession corresponding to successive straight segments of a broken line representative of the ignition advance correction curve as a function of said intake manifold pressure, each of said coefficients comprising a plurality of main bits representative of the absolute value of said coefficient, a sign bit representative of the sign of said coefficient, and at least a validation bit associated to a corresponding one of said external advance corrections and which, according to its value, enable and disable the sending of said one external advance correction to said advance computer means by said external advance corrections intake means.

2. The improvement of claim 1, wherein each of said coefficients of said second memory comprises several validation bits, each associated with one of said external advance corrections.

3. The improvement of claim 1, wherein said advance computer means comprises:

an up and down counter for advance calculation, including main inputs which are connected to outputs of said first memory storing full load advance values, an up down input and a clock input;

a first switching means including outputs connected to said up down input and clock input of said up and down counter, a sign input, a first clock input connected to the highest significant bit output of said pressure counter through a binary rhythm multiplier and a divider connected in series, and a second clock input connected to the output of said external advance corrections intake means; and a second switching means including main inputs connected to outputs of said second memory storing advance correction coefficients, a first group of outputs connected to inputs of said binary rhythm multiplier, and a second group of outputs connected to validation inputs of said external advance corrections intake means.

4. The improvement of claim 3, wherein said pressure counter comprises two outputs immediately below said most significant bit output in order to significance, said two outputs being connected to inputs of an addressing coder in connection with said speed counter and with said read only memory means, and another output immediately below said two outputs in order of significance, said other output being connected to said second switching means.

5. The improvement of claim 4, wherein said second switching means has a sign output connected to said sign input of said first switching means for transmitting said sign bit of said coefficient, through said first switching means, to said up-down input of said counter for advance calculation.

6. The improvement of claim 3, wherein said pressure counter comprises an input, said input being connected to the output of a logical AND gate having a first, a second and a third input, said first input being connected to said sequencer for receiving therefrom a square wave extending during said second measuring time, said second input being connected to said digital pressure sensor, and said third input being connected to the output of a gates assembly generating a signal for overflow and synchronization.

7. The improvement of claim 1, wherein said read only memory means further comprises a third memory for storing conduction time values, said third memory being addressed responsive to content of said speed counter.

8. The improvement of any of claims 1 to 7, wherein said addressing means comprise an addressing coder with variable pitch, connected between said speed counter and said read only memory means, for addressing said memory means.

9. The improvement of claim 8, wherein said variable pitch addressing coder comprises a third switching means for connecting correlation speed, an address coder and a pitch coder.

* * * * *